I. SPITZ.
Horse-Brake.
No. 204,258. Patented May 28, 1878.
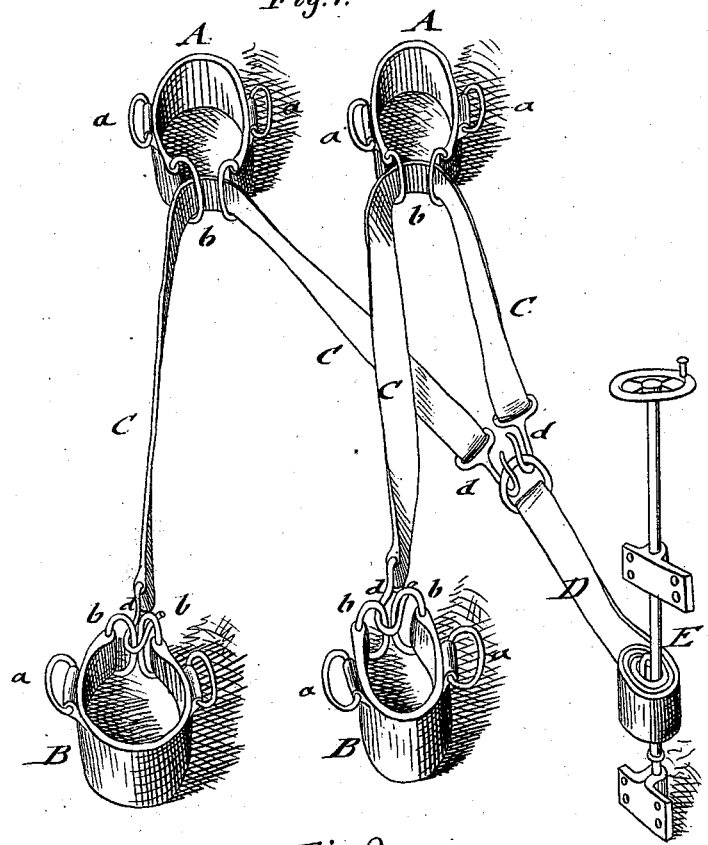
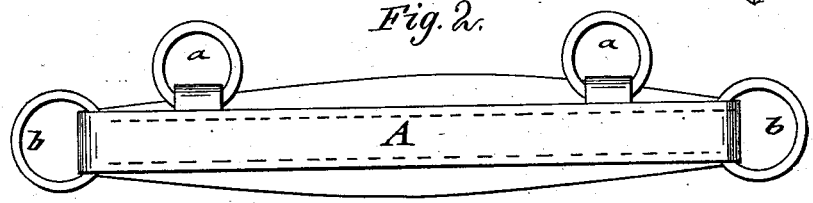
WITNESSES:
Henry N. Miller
C. Sedgwick
INVENTOR:
I. Spitz
BY Munn & Co
ATTORNEYS.

UNITED STATES PATENT OFFICE.

ISRAEL SPITZ, OF CHICAGO, ILLINOIS.

IMPROVEMENT IN HORSE-BRAKES.

Specification forming part of Letters Patent No. 204,258, dated May 28, 1878; application filed April 19, 1878.

*To all whom it may concern:*

Be it known that I, ISRAEL SPITZ, of Chicago, in the county of Cook and State of Illinois, have invented a new and Improved Horse-Brake, of which the following is a specification:

In the accompanying drawing, Figure 1 represents a perspective view of my improved horse-braking device; and Fig. 2 is a detailed side view of one of the brake-straps, showing the construction of the same.

Similar letters of reference indicate corresponding parts.

The object of this invention is to furnish an improved device for controlling or braking horses, so as to prevent them from running away, and bringing them instantly, in case of danger, within the power of the driver or rider, the brake being hung to the harness, and operated either by connection with a winding-up hand-shaft and pawl-and-ratchet device of the vehicle, or on the front horn of the saddle; and the invention consists of straps with side and end rings applied to the front and hind legs, and suspended from the collar and breeching below the first joint, the encircling straps being connected by brake-straps hooked to the end rings of the hind straps, and passed through to the end rings of the front straps, and to the winding-up strap and hand-shaft, with ratchet-and-pawl mechanism arranged on the side of the box-board of a vehicle or agricultural machine, or on the horn of a saddle.

Referring to the drawing, A are the front straps or loops, and B the larger hind straps or loops, that are all applied to the horse's legs immediately below the first joint, and hung, respectively, by suspension-straps attached to side rings $a$, to the front part of the collar and the breeching. The leg-encircling straps or loops A and B are provided with end rings $b$, that serve to attach them to the connecting brake-straps C, which are hooked by spring-snaps $d$ or otherwise, to the hind loops, and passed through the end rings of the front loops and back sidewise of the horse to a winding-up strap, D, to which the brake-straps are snapped in similar manner as to the hind loops.

The winding-up strap D is attached to a crank-shaft, E, with suitable ratchet and pawl or other lock device.

The crank-shaft is operated by a hand-wheel, in the usual manner, so as to wind up the rear strap D, or release the same therefrom.

The hind loops are made larger than the front loops, so that they adapt themselves to the larger size of the hind legs without hurting or chafing the same.

The hand crank-shaft is applied to one side of the dash-board of the vehicle, or of the box-board of a plow or other agricultural machine, or to the horn of a saddle, so that in case of danger the brake-straps may be readily tightened or loosened, as required.

When the device is used with a saddle, the brake-straps are snapped first into the rings of the front loops, then passed through the rings of the hind loops, and then up to the winding-shaft of the saddle.

When the horse attempts to run away, or is otherwise unruly, the hand-wheel is turned, and thereby the brake-straps are tightened, so that the front and hind legs of the horse may be drawn together, and the horse thereby prevented from the use of his legs until the crank-shaft is unfastened, when the straps will be readily loosened again by the motion of the horse.

The brake device may also be used in place of a tying or hoppling device.

When leaving the horse in the street, all that is required is to wind up the shaft and tighten the straps sufficiently to prevent the horse from moving.

By means of the brake device, the horse is fully within the control of the rider or driver, and may be held with greater safety than when tied by the head or mouth.

Having thus described my invention, I claim as new and desire to secure by Letters Patent—

The combination, with the leg-encircling straps or loops A and B, having side suspension-rings and end rings, of connecting brake-straps, that are, respectively, attached and passed through the rings of the loops, and with a winding-up strap and mechanism of the vehicle or saddle, substantially as and for the purpose specified.

ISRAEL SPITZ.

Witnesses:
W. B. ARONSON,
SAMUEL × BLACK.
his mark.